(12) United States Patent
Crowell et al.

(10) Patent No.: US 11,598,447 B2
(45) Date of Patent: Mar. 7, 2023

(54) HAZARDOUS MATERIAL CONTAINER PLUG

(71) Applicant: Micro Matic USA, Inc, Brooksville, FL (US)

(72) Inventors: Jeffrey Crowell, Brooksville, FL (US); Michael Tomlinson, Spring Hill, FL (US); Jeff Smigiel, Northridge, CA (US)

(73) Assignee: MICRO MATIC USA, INC., Brooksville, FL (US)

( * ) Notice: Subject to any disclaimer, the term of this patent is extended or adjusted under 35 U.S.C. 154(b) by 0 days.

(21) Appl. No.: 17/409,087

(22) Filed: Aug. 23, 2021

(65) Prior Publication Data

US 2022/0178465 A1    Jun. 9, 2022

Related U.S. Application Data

(60) Provisional application No. 63/121,623, filed on Dec. 4, 2020.

(51) Int. Cl.
*F16K 35/10*    (2006.01)
*B65D 47/30*    (2006.01)
*F16K 27/02*    (2006.01)

(52) U.S. Cl.
CPC .............. *F16K 35/10* (2013.01); *B65D 47/30* (2013.01); *F16K 27/02* (2013.01)

(58) Field of Classification Search
CPC .... B65D 47/145; B65D 47/146; B65D 47/24; B65D 47/241; B65D 47/30; B65D 47/36; F16K 27/02; F16K 27/0232; F16K 27/12; F16K 35/06; F16K 35/10

USPC ................ 70/175, 176, 177, 178, 179, 180; 222/400.7, 509, 513, 518, 548, 549, 550, 222/554; 251/89, 89.5, 90, 95

See application file for complete search history.

(56) References Cited

U.S. PATENT DOCUMENTS

| | | | | |
|---|---|---|---|---|
| 729,145 | A * | 5/1903 | Eckenwiler | B67D 1/0832 222/506 |
| 1,021,669 | A * | 3/1912 | Frisholm | B67D 1/0832 137/212 |
| 1,788,786 | A * | 1/1931 | Arthur | F16K 35/06 137/513 |
| 4,874,105 | A * | 10/1989 | Tetreault | E03F 5/02 220/8 |
| 5,647,712 | A * | 7/1997 | Demirdogen | F16B 23/0076 411/404 |
| 5,765,980 | A * | 6/1998 | Sudo | F16B 23/0076 411/404 |
| 6,659,302 | B2 * | 12/2003 | Lin | A47G 19/2272 222/509 |
| 2020/0080660 | A1 * | 3/2020 | Dyer | F04B 53/22 |

* cited by examiner

*Primary Examiner* — Kevin F Murphy
*Assistant Examiner* — Jonathan J Waddy
(74) *Attorney, Agent, or Firm* — Burr & Forman LLP; Ryan M. Corbett (57) ABSTRACT

A plug for a valve for a container that may contain hazardous materials is provided. The plug may include an outer wall, and one or more keys disposed on an external surface of the outer wall. The keys may be sized and shaped to respectively fit within one or more corresponding notches and one or more circumferential grooves in the valve to secure the plug to the valve.

11 Claims, 11 Drawing Sheets

HAZARDOUS MATERIAL CONTAINER PLUG

CROSS-REFERENCE TO RELATED APPLICATION

This application claims the benefit of U.S. Provisional Patent Application No. 63/121,623, filed on Dec. 4, 2020, which is incorporated herein by reference in its entirety.

FIELD

The present disclosure relates generally to a container for holding various chemicals or other materials, and more particularly to a plug for a valve of said container.

BACKGROUND

Hazardous chemicals are packaged for transport in containers ranging from two US gallons to several hundred US gallons. These packages are regulated by local, state (territory), and/or federal agencies to comply with standards developed to meet or exceed United Nations model regulations on the transport of dangerous goods. When a package of dangerous goods is closed and transported with a valve assembly, the valve assembly is considered an integral part of the package and must be rigorously tested within the context of the package to pass the regulatory standards. These tests include three test commonly known as the "drop-test," "leak-proof test," and "hydrostatic test."

Figure 1A:
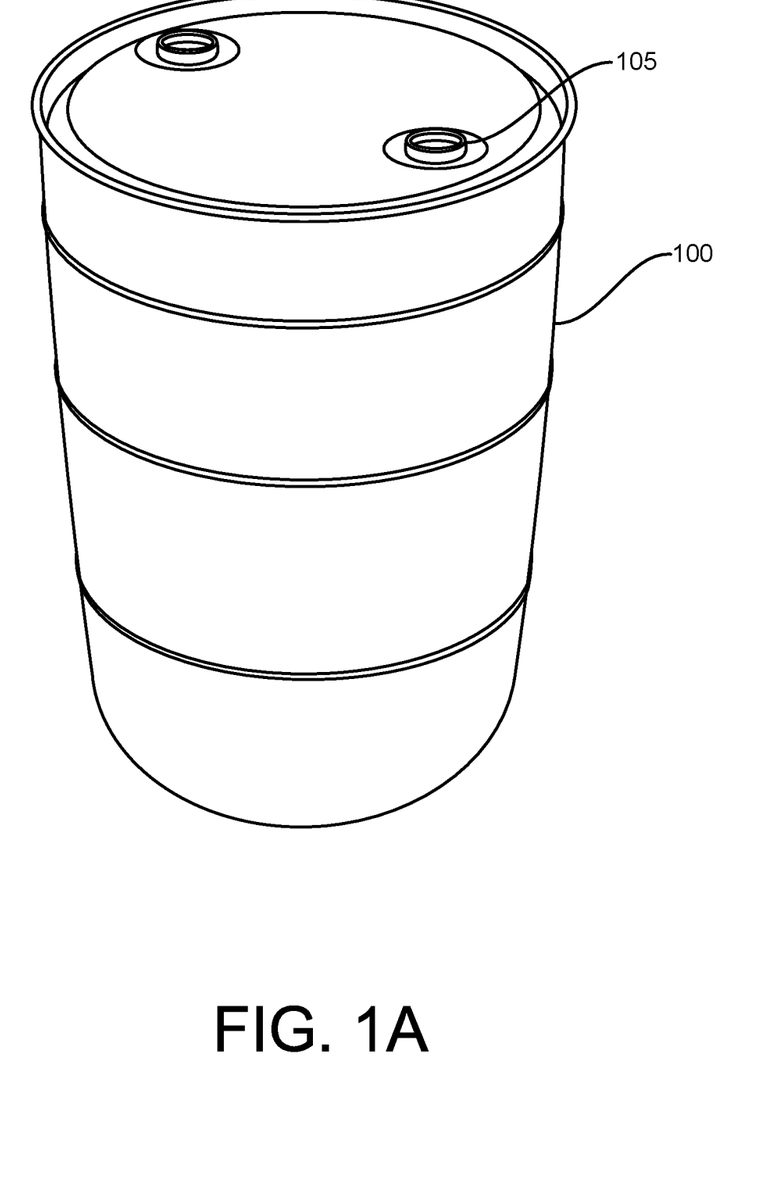
FIG. 1A illustrates a perspective view of a container and an upper lip thereof according to the prior art.
Figure 1B:
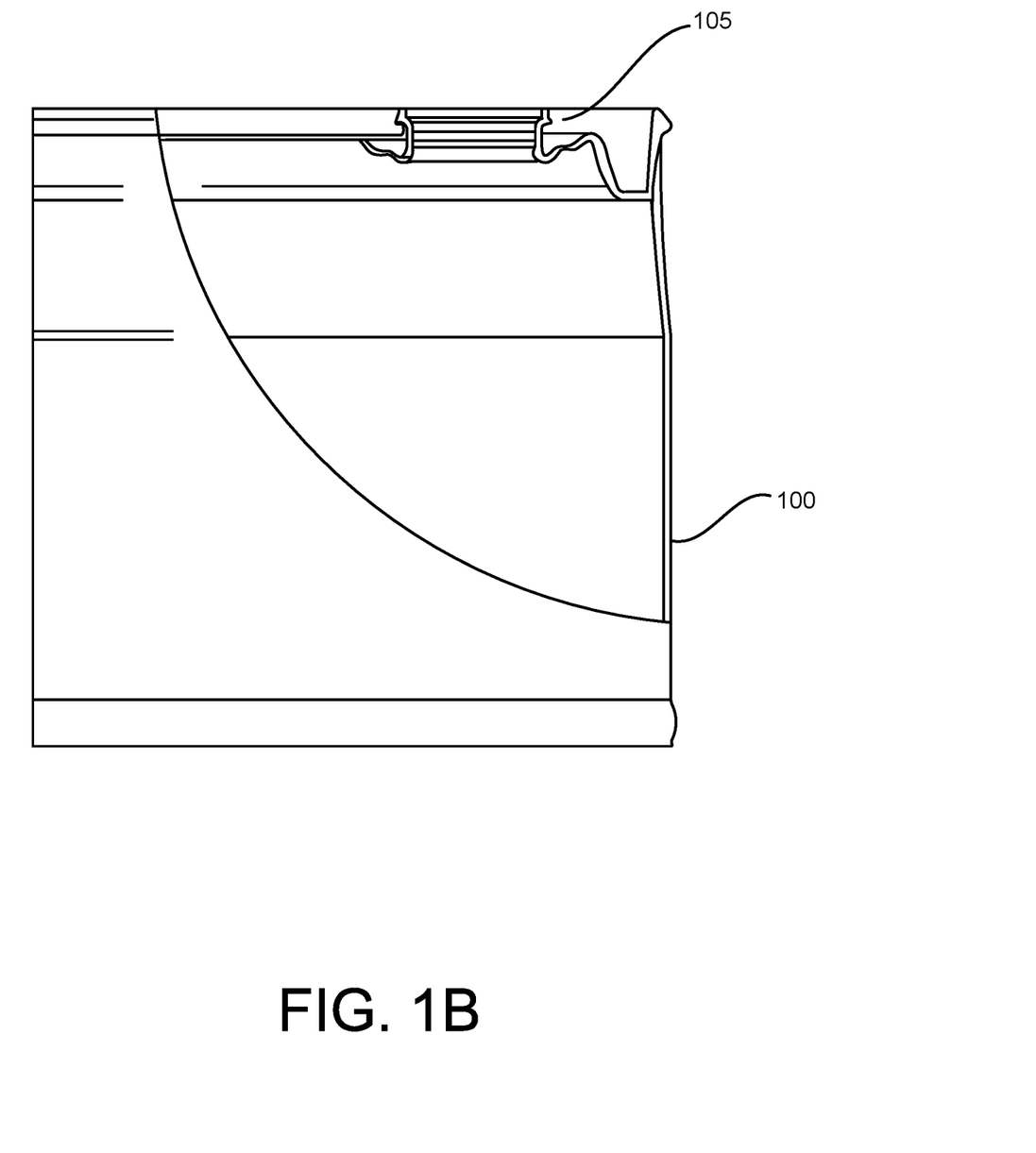
FIG. 1B illustrates a cross-sectional view of a container and an upper lip thereof according to the prior art.

A valve typically fails a drop-test by suffering a crushing blow on its exposed upper lip, resulting in leaks at either or both the external gasket and (more frequently) the inner profile seal. For example, FIGS. 1A and 1B show perspective and cross-sectional views, respectively, of a container 100, and the upper lip 105 of the container that may be damaged during a drop test. A valve is typically located within the upper lip 105 of the container, and is configured to receive a coupler for inputting or extracting contents to or from the container 100. Prior art valves are sometimes made of stainless steel, which reinforces the upper lip 105 to reduce the risk of damaging the upper lip 105 of the container during the drop test. However, certain chemicals are corrosive to stainless steel, such that stainless steel valves cannot be used with a container holding these chemicals. Additionally, stainless steel valves can be cost-prohibitive for certain applications. Composite valves, typically made of plastic, have been used with containers holding chemicals that are corrosive to stainless steel and/or for applications in which stainless steel valves are cost prohibitive. However, these plastic composite valves are not as strong as stainless steel, which leaves the upper lip of containers using plastic composite valves vulnerable to failing the drop test. This is especially problematic for containers holding hazardous materials, which must meet a more stringent drop test standard. Accordingly, there is a need for a valve system that can be used with chemicals that are corrosive to stainless steel, and/or for applications in which stainless steel valves are cost prohibitive, but that can reinforce the upper lip of the container to prevent failure during the drop test.

SUMMARY

According to an aspect of one or more exemplary embodiments, there is provided a plug for a valve. The plug may include an outer wall and one or more keys disposed on an external surface of the outer wall. The keys may be sized and shaped to respectively fit within one or more corresponding notches and one or more circumferential grooves in the valve to secure the plug to the valve.

The plug may be configured to be inserted into the valve so that the one or more keys of the plug are respectively inserted into the one or more notches, and the one or more keys of the plug are respectively rotated within the one or more circumferential grooves in a first direction. The plug may also include an inner wall disposed within the outer wall, and one or more coupling members configured to couple the inner wall to the outer wall. The plug may also include a socket drive disposed within the inner wall and configured to receive a device to rotate the plug within the valve in the first direction. The socket plug may include one or more reliefs configured to prevent the device from rotating the plug within the valve in a second direction.

The plug may include a hole configured to be aligned with one of the notches in the valve, and a tamper-evident pin configured to be inserted into the hole and a notch in the valve. The tamper-evident pin may be configured to break when pressed against a side wall of the notch by rotating the plug. The tamper-evident pin may include a cap portion and an elongated portion. The elongated portion may be configured to be inserted through the hole in the plug and into one of the notches in the valve, and the cap portion may be configured to be disposed above a top surface of the plug when the elongated portion is inserted into the notch in the valve.

According to another aspect of one or more exemplary embodiments, there is provided a valve-plug assembly having a valve including a valve body configured to be inserted into a well opening of a container, an upper edge having one or more notches, and one or more circumferential grooves at least partially overlapping with said one or more respective notches. The valve-plug assembly may also include a plug having an outer wall and one or more keys disposed on an external surface of the outer wall. The one or more keys may be sized and shaped to respectively fit within the one or more notches and the one or more circumferential grooves to secure the plug to the valve.

The valve may include a threaded portion configured to engage a threaded portion of the well opening of the container. The plug may be configured to be inserted into the valve so that the one or more keys of the plug are respectively inserted into the one or more notches, and the one or more keys of the plug are respectively rotated within the one or more circumferential grooves in a first direction. The plug may also include an inner wall disposed within the outer wall, and one or more coupling members configured to couple the inner wall to the outer wall.

The plug may also include a socket drive disposed within the inner wall and configured to receive a device to rotate the plug within the valve in the first direction. The socket drive may include one or more reliefs configured to prevent the device from rotating the plug within the valve in a second direction. The valve-plug assembly may include a tamper-evident pin. The plug may include a hole that is configured to be aligned with one of the notches in the valve. The pin may be configured to be inserted into the hole and said one of the notches in the valve, and may be configured to break when pressed against a side wall of the notch by rotating the plug in the second direction. The tamper-evident pin may include a cap portion and an elongated portion. The elongated portion may be configured to be inserted through the hole in the plug and into one of the notches in the valve. The cap portion may be configured to be disposed above a top surface of the plug when the elongated portions is inserted into one of the notches in the valve.

DETAILED DESCRIPTION OF EXEMPLARY EMBODIMENTS

Reference will now be made in detail to the following exemplary embodiments, which are illustrated in the accompanying drawings, wherein like reference numerals refer to like elements throughout. The exemplary embodiments may be embodied in various forms without being limited to the exemplary embodiments set forth herein. Descriptions of well-known parts are omitted for clarity.

Figure 2:
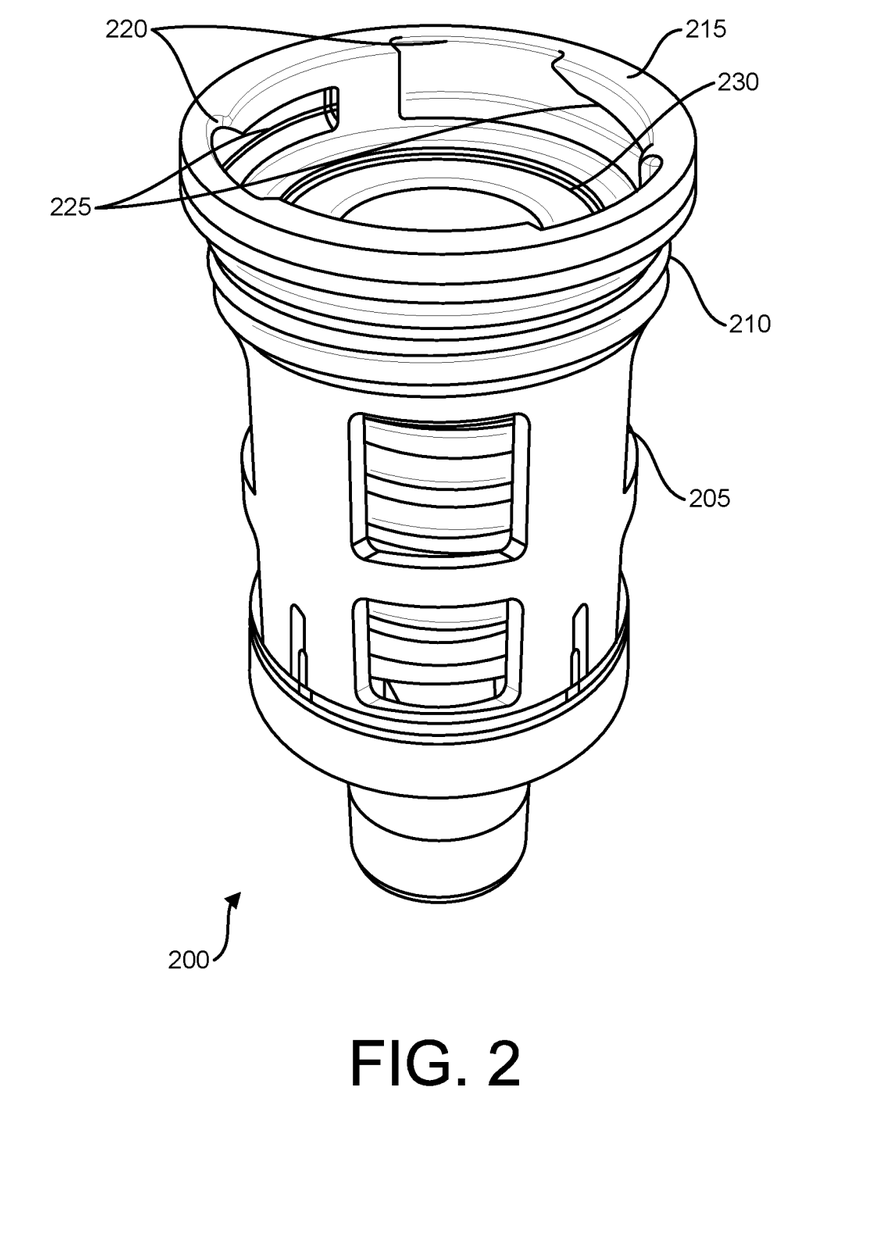
FIG. 2 illustrates a side view of a valve according to an exemplary embodiment.

FIG. 2 shows a valve 200 according to an exemplary embodiment. The valve 200 includes a valve body 205 that fits within a well opening, or cavity within the upper lip of the container. The valve 200 may include a threaded portion 210 that is configured to engage a corresponding threaded portion that is located on the inner circumference of the upper lip of the container. The valve 200 may have an upper edge 215 that is configured to be co-planar with, or extend slightly above, the top edge of the upper lip of the container, as shown in FIG. 1. The upper edge of the valve may include one or more notches or cutouts 220 that are configured to receive a plug, as will be described further below. The valve 200 may also include one more circumferential grooves 225 that extend around a partial circumference of the valve 200. Each circumferential groove 225 corresponds with and is continuous with one of the notches 220 that are configured to receive the plug, as explained below.

Figure 3:
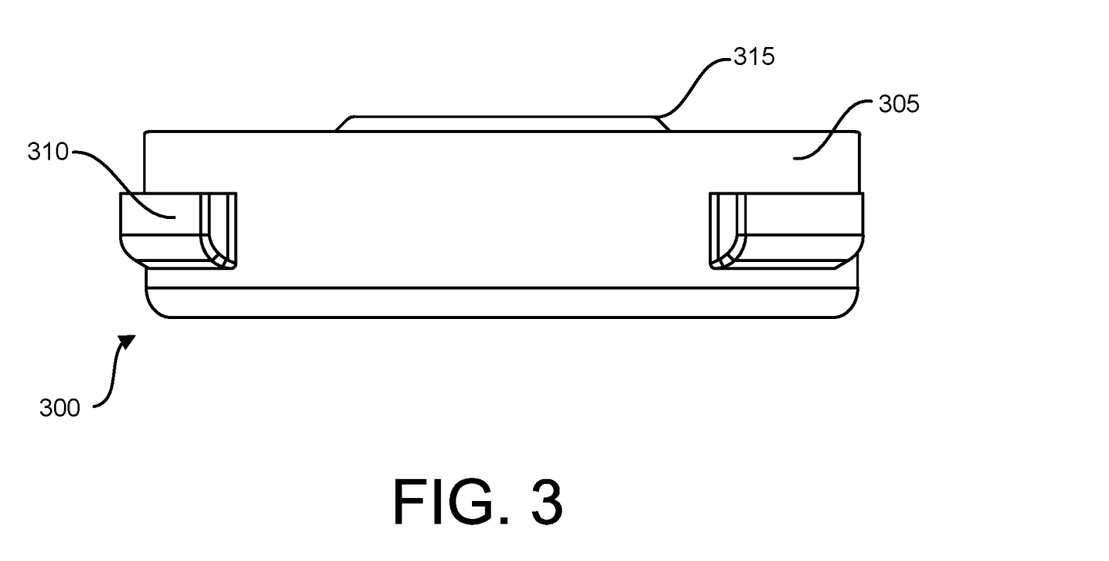
FIG. 3 illustrates a side view of a plug according to an exemplary embodiment.
Figure 4:
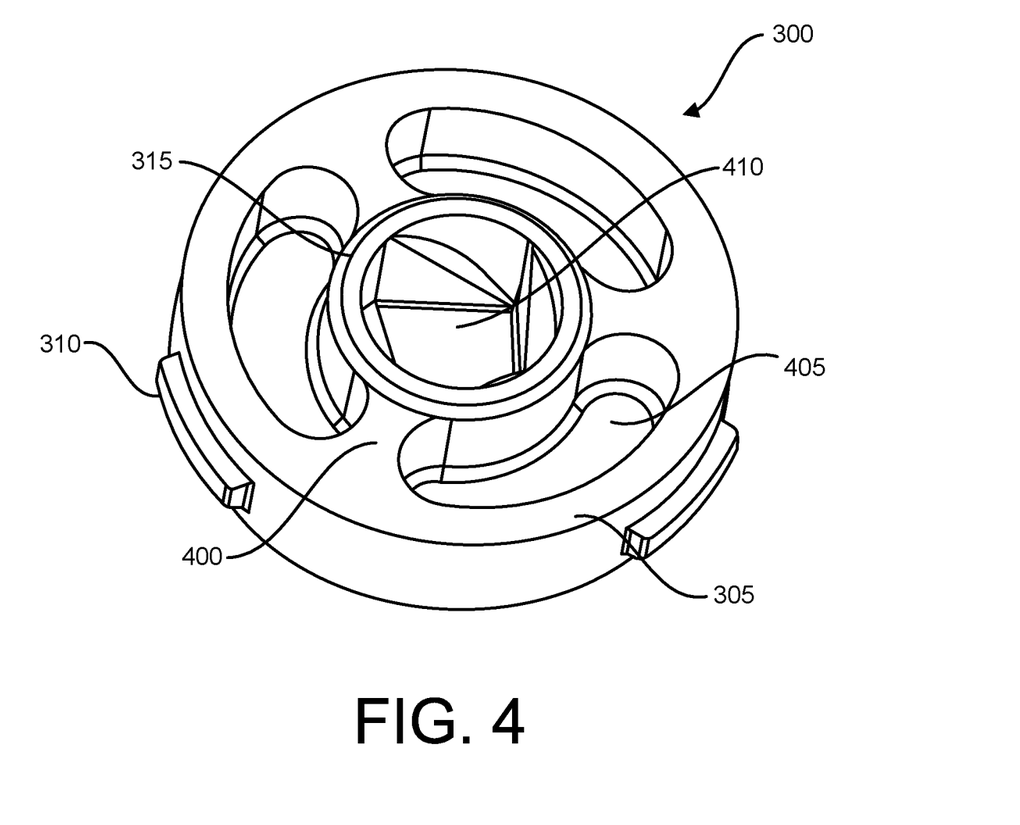
FIG. 4 illustrates a top view of a plug according to an exemplary embodiment.
Figure 5A:
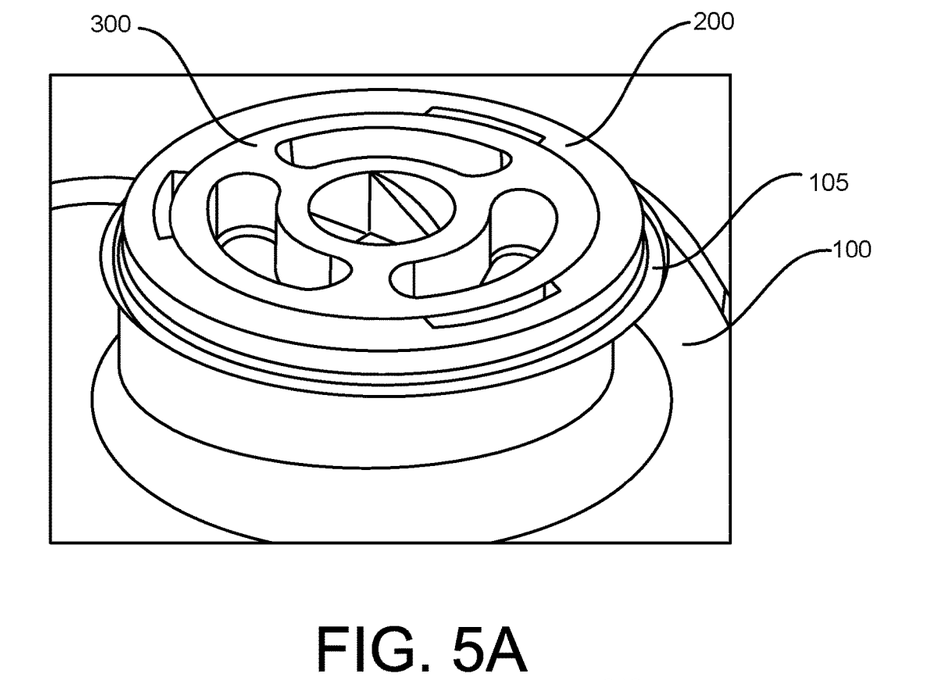
FIG. 5A illustrates a valve-plug assembly that includes a plug inserted into a valve according to an exemplary embodiment.

FIG. 3 shows a side view of a plug 300 according to an exemplary embodiment. FIG. 4 shows a top view of a plug 300 according to an exemplary embodiment. FIG. 5A shows the plug 300 inserted into the valve 200 within the upper lip 105 of the container 105 according to an exemplary embodiment. Referring to FIGS. 3-5A, the plug 300 according to an exemplary embodiment may include an outer wall 305 that may be round, however the outer wall 305 may take different shapes depending on the shape of the valve 200 and/or the well within the upper lip 105 of the container 100. The exemplary plug 300 may include one or more keys 310 located on the outer circumferential surface of the outer wall 305, and extending radially outward therefrom. Each key 310 is configured to be received by a corresponding notch 220 in the valve 200. The plug 300 may be press fit into a center portion of the valve 200 so that each key 310 of the plug 300 is aligned with a corresponding notch 220 in the valve 200. When the plug 300 is inserted into the valve 200 to the point where each key 310 reaches the bottom of its respective notch 220, each key 310 will be horizontally aligned with a corresponding circumferential groove 225. The plug 300 may then be rotated so that the keys 310 of the plug 300 rotate within a respective circumferential groove 225 of the valve 200. Because the keys 310 are contained by the circumferential grooves 225, the plug 300 is secured within the valve 200, and may not be removed by pulling the plug 300 straight out of the valve 200.

As shown in the exemplary embodiments of FIGS. 3-5A, the plug 300 may include an inner wall 315 which may be circular in shape and sized to fit within the outer wall 305 of the plug 300. The inner wall 315 may be connected to the outer wall 305 by one or more connecting members 400. As shown in FIGS. 3-4, three connecting members 400 connect the outer wall 305 to the inner wall 315, and are separated by cavities 405 that extend circumferentially between connecting members 400, and may be used by a user to grip and rotate the plug 300. When the plug 300 is installed, the plug 300 may brace the upper lip 105 of the container 100 during a drop test by providing an outward pressing force against the crushing inward force experienced by the upper lip 105 during the drop test. The plug 300 may also protect sealing surfaces visible within the well from dust or debris, and may reduce the likelihood of foreign matter entering the contents of the container 100. The plug 300 and/or the valve 200 may be made from various materials, including for example, plastic or plastic composite. These materials may be chosen so that they do not corrode when coming into contact with the contents of the container 100.

According to the exemplary embodiment of FIGS. 3-5C, a socket drive 410 may be included within the inner wall 315 to receive a device, such as a torque wrench in order to rotate the plug 300 within the valve 200. For example, the valve 200 may be rotated in a clockwise direction so that the threaded portion 210 of the valve 200 engages the corresponding threaded portion of the upper lip 105 of the container 100. The plug 300 may then be inserted so that the keys 310 of the plug 300 align with corresponding notches 220 of the valve 200, and the plug 300 may be rotated in the clockwise direction, which causes the keys 310 of the plug 300 to move within the circumferential grooves 225 of the valve 200. In addition, if the plug 300 is already inserted into the valve 200 but the valve 200 has not been inserted into the well of the container 100, the socket drive 410 may receive a torque wrench to install the valve 200 and plug 300 into the well of the upper lip 105 of the container 100. More specifically, because the keys 310 of the plug 300 are engaged within the circumferential grooves 225 of the valve 200, using a torque wrench within the socket drive 410 will cause the plug 300 and valve 200 to rotate so that the threaded portion 210 of the valve engages a threaded portion of the upper lip 105 of the container 100.

Figure 5B:
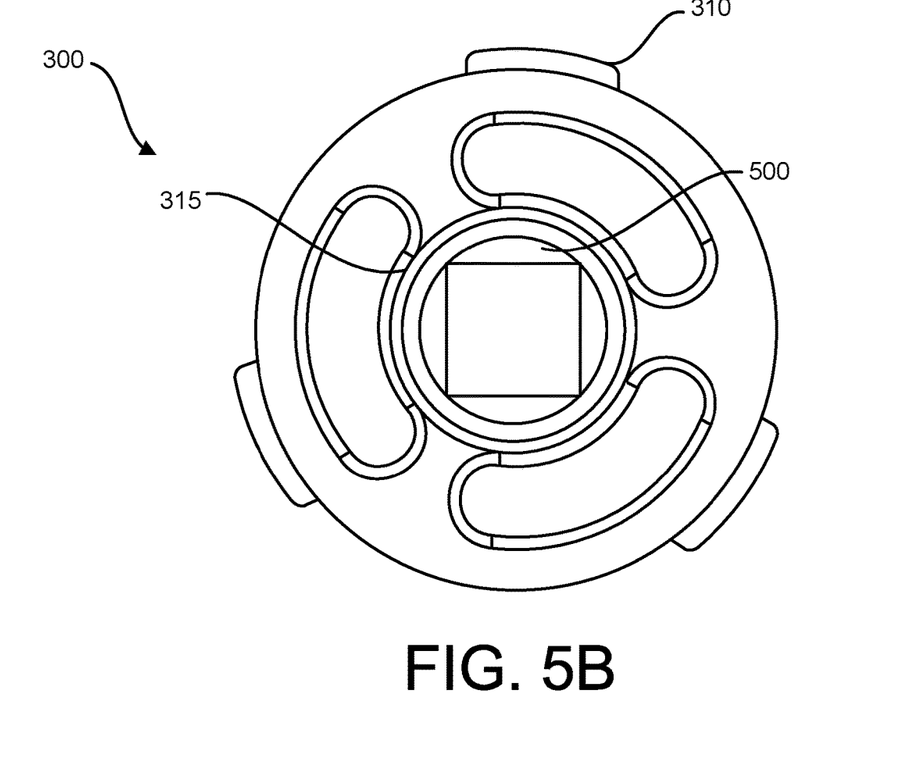
FIG. 5B illustrates a downward view of a plug according to an exemplary embodiment.
Figure 5C:
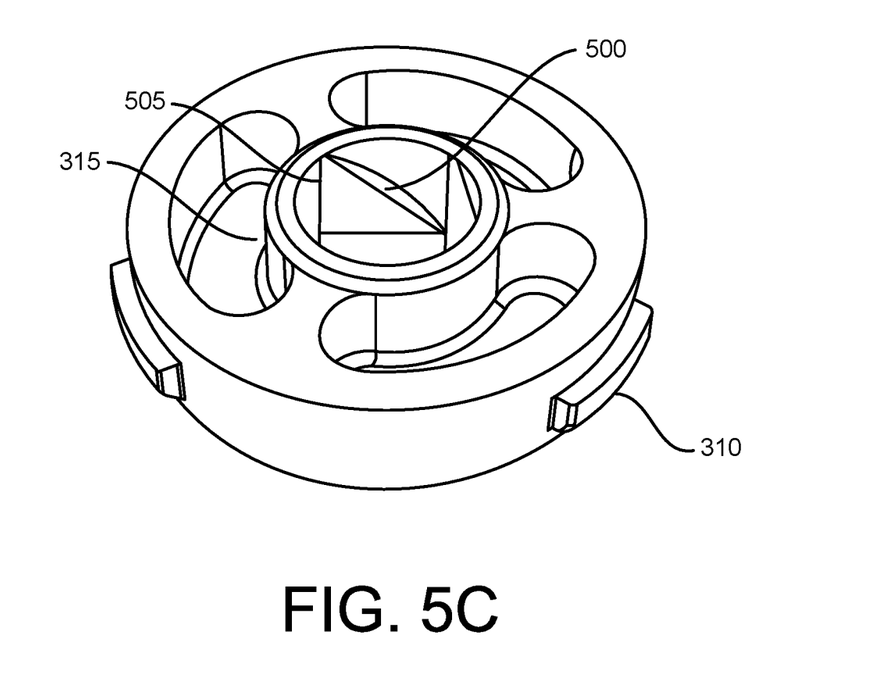
FIG. 5C illustrates a perspective view of a plug according to an exemplary embodiment.

The socket drive 410 may include counter-clockwise reliefs that prevent the plug from deliberately or inadvertently being used to loosen the valve. More specifically, FIG. 5B shows a downward view of the plug 300 according to an exemplary embodiment, and FIG. 5C shows a perspective view of the plug 300 according to an exemplary embodiment. As shown in FIG. 5B, when looking down into the hole defined by the inner wall 315, the inner wall 315 includes a round opening surrounding a square opening. As shown in FIG. 5C, when looking at any single face of the hole defined by the inner wall 315, the square opening is defined by four triangular faces 505, and the round opening is defined by four semi-circular ramps 500 following up to the top edge of each triangular face 505.

When a square drive (not shown) is inserted into the hole and turned clockwise, the leading corners of the drive are pressing against the tallest edges of the triangular faces 505 and turn the plug 300 in a clockwise direction. When the square drive is turned counterclockwise, the leading corners of the drive ride up on the semi-circular ramps 500, because the triangular faces 505 are diminished to a point in that direction. In other words, in the clockwise direction the drive is presented with a flat face to drive against (and thereby rotate the plug 300), but in the counterclockwise direction the drive is presented with a semi-circular ramp 500, lifting it out of the hole without rotating the plug 300. Although in the example described above, clockwise and counterclockwise were used to describe the directions for rotating and not rotating the plug 300, however these directions are merely exemplary and may be reversed.

According to an alternative embodiment, the plug 300 may be a solid component with no cavities 405 between connecting members 400 and no inner wall 315 containing a socket drive 410. According to another exemplary embodiment, the plug 300 may include the inner wall 315 and the socket drive 410 within the inner wall 315, and one solid connecting 400 member that is continuous around the entire inner circumference of the plug between the inner wall 315 and outer wall 305.

Figure 6A:
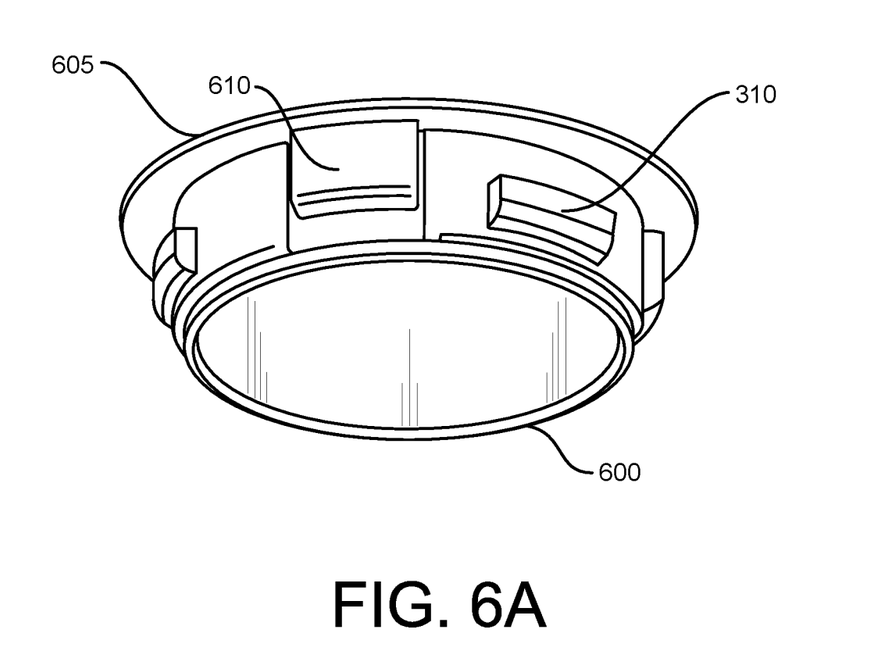
FIG. 6A illustrates a perspective view of a plug having an annular gasket according to an exemplary embodiment.
Figure 6B:
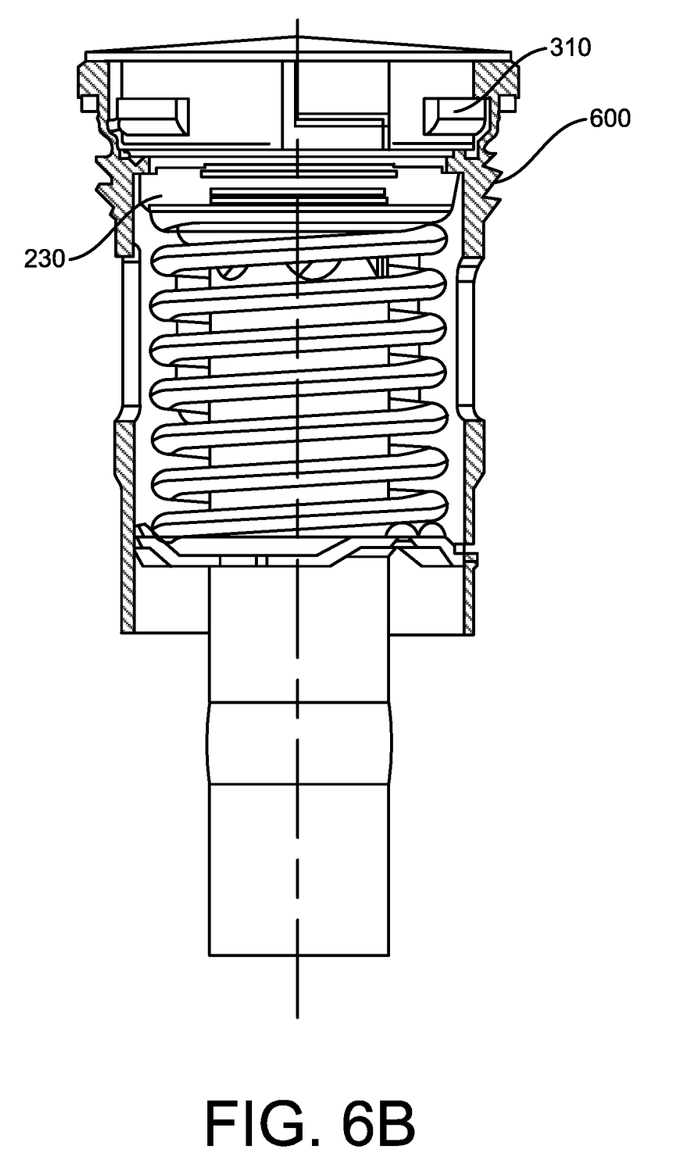
FIG. 6B illustrates a cross-sectional view of valve-plug assembly that includes a plug having an annular gasket according to an exemplary embodiment.

According to an exemplary embodiment, as shown in FIG. 6A, the plug 300 may include an annular gasket 600 located at the base of the plug 300. The annular gasket 600 may extend around and downward from the circumference of the bottom edge of the plug 300. As shown in FIG. 6B, the annular gasket 600 may provide a secondary seal above the valve seal 230 of the valve 200 to provide additional protection against leaking. The annular gasket 600 may encapsulate and seal the region around the valve seal 230 so that if the valve seal 230 is dislodged and begins to leak, the contents of the container 100 will leak into a sealed cavity formed by the body of the plug 300 and the annular gasket 600.

Figure 7:
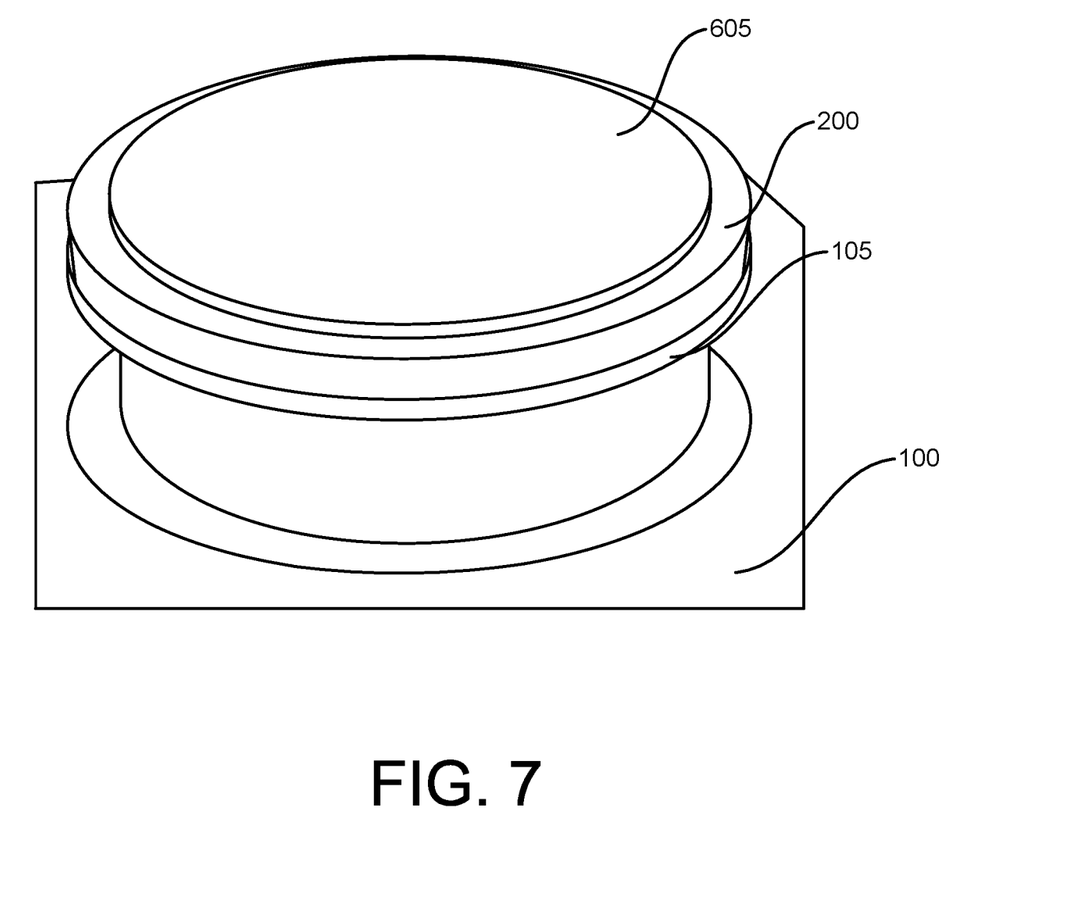
FIG. 7 illustrates a cover inserted into the valve-plug assembly above the plug according to an exemplary embodiment.

According to an exemplary embodiment, a cover 605 may be provided, as shown in FIGS. 6A and 7. Referring to FIGS. 6A and 7, when the keys 310 of the plug 300 are fully inserted into the notches 220 of the valve 200, a space exists within each notch 220 above the key 310. The cover 605 may include a substantially flat horizontal top surface, and include one or more blades 610 extending substantially perpendicular from the top surface of the cover 605. The blades 605 may be sized and shaped to fit in the space within the notches 220 above the keys 310 of the plug 300. By filling these spaces between the valve 200 and the plug 300, the cover 605 may further reinforce the upper lip 105 from inwardly pressing forces experienced during a drop test.

According to an exemplary embodiment, the cover may be a tamper-evident cover that will indicate if the cover 605 and/or the plug 300 has been tampered with or removed. For example, the blades 610 of the cover 605 may fit so securely within the notches 220 of the valve 200 that the cover 605 must be destroyed to remove the cover 605 from the plug 200. Because a tool is needed to remove the valve 200 by driving against the notches 220 and circumferential grooves 225 of the valve 200, and because access to the valve seal 230 is needed to use the valve 200, the contents of the container 100 cannot be tampered with or removed without destroying the cover 605.

Figure 8:
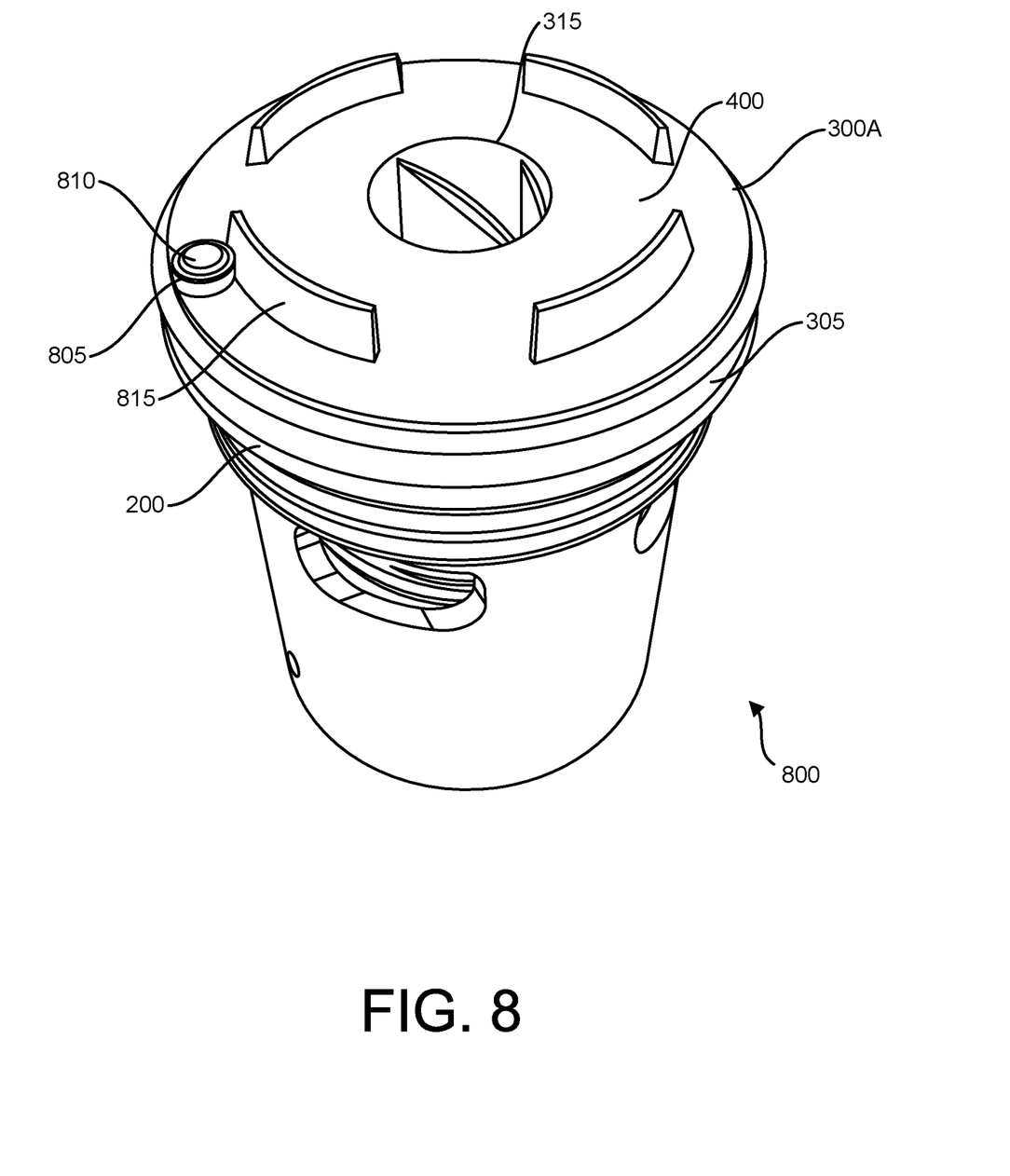
FIG. 8 illustrates a perspective view of a valve-plug assembly according to an exemplary embodiment.
Figure 9:
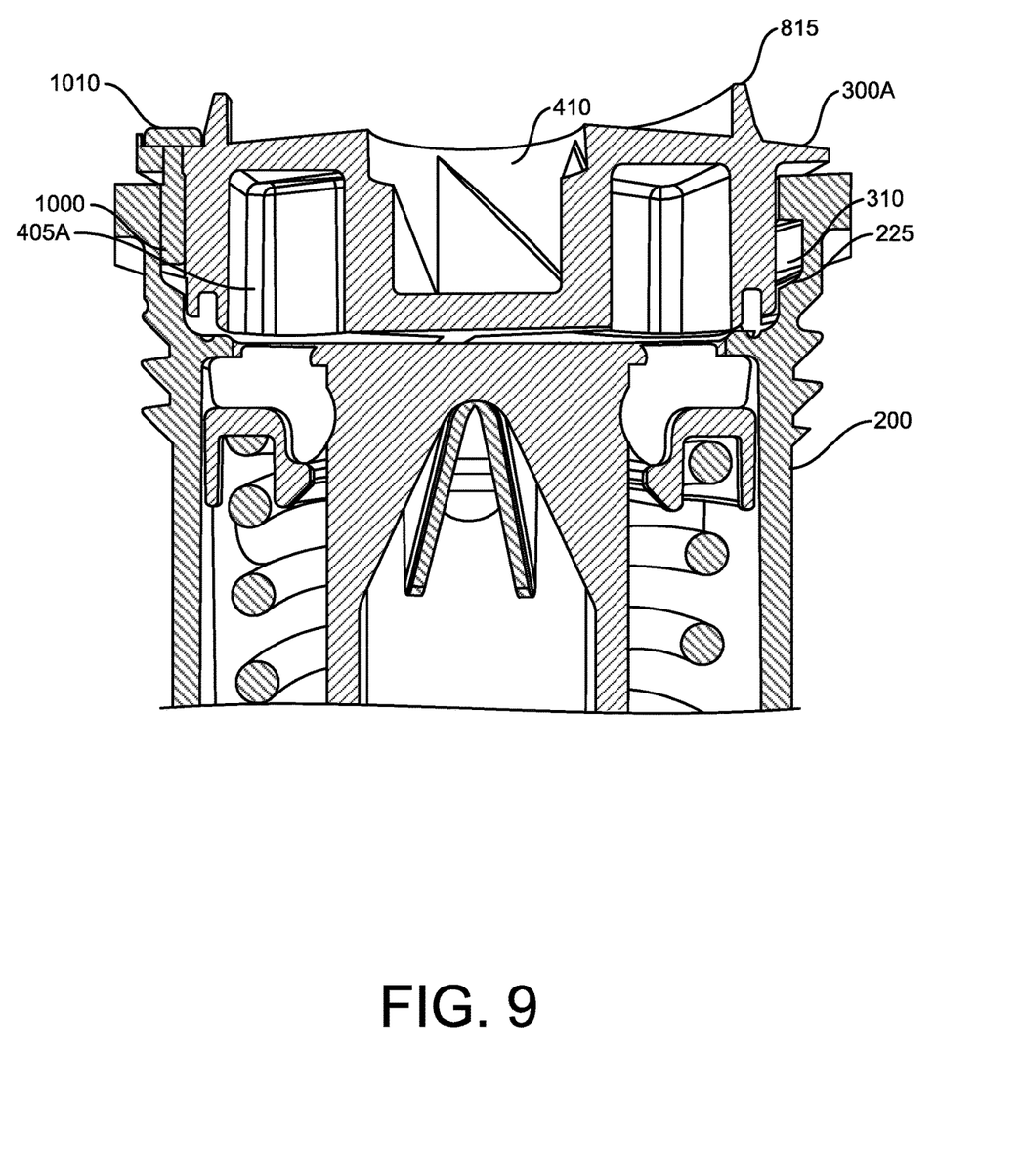
FIG. 9 illustrates a cross-section view of a valve-plug assembly according to an exemplary embodiment.
Figure 10:
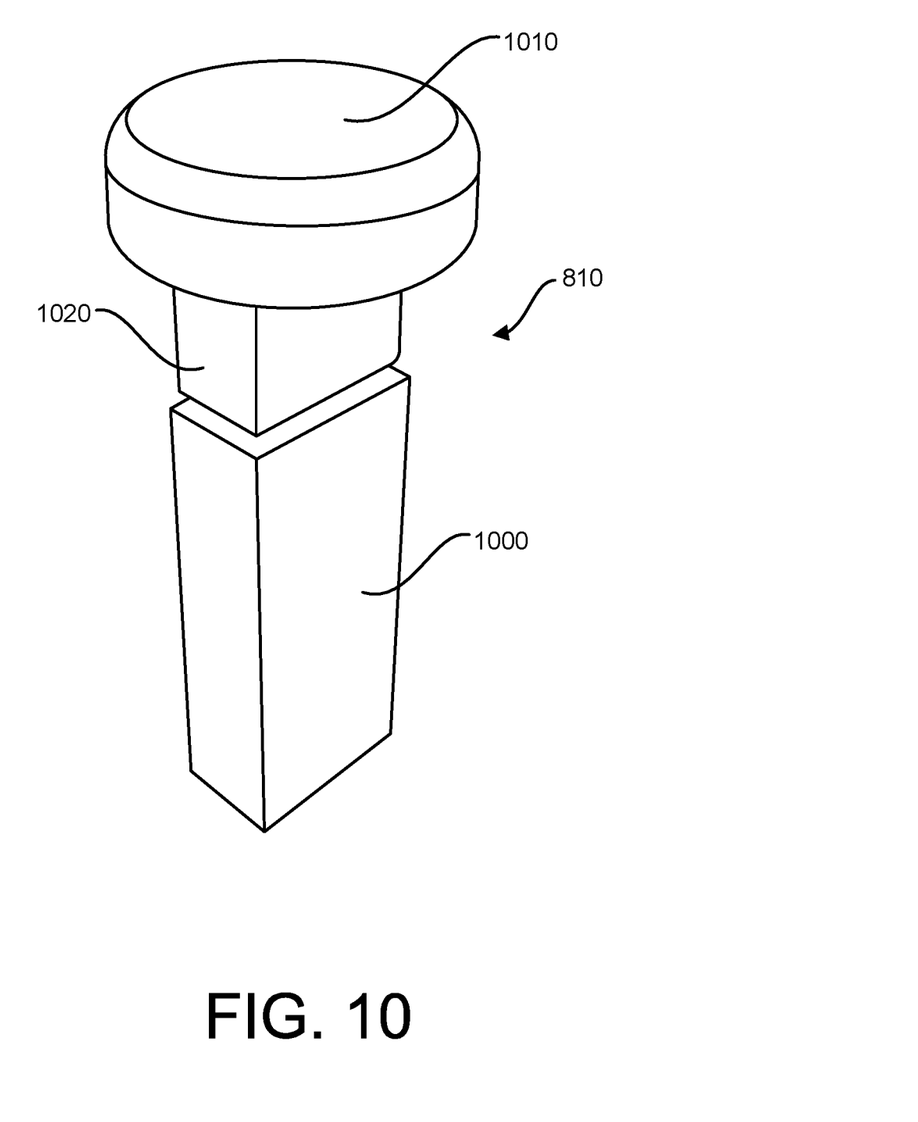
FIG. 10 illustrates a perspective view of a tamper-evident pin according to an exemplary embodiment.

According to another exemplary embodiment, the plug may be a tamper-evident plug, and the cover 605 may not be needed to indicate attempts to tamper with or remove the plug 300. FIGS. 8 and 9 respectively show perspective and cross-sectional views of a valve-plug assembly 800 according to an exemplary embodiment in which the plug is a tamper-evident plug 300A. Referring to FIGS. 8 and 9, the valve-plug assembly 800 may include a plug 300A having a hole 805 configured to receive a pin 810. As shown in FIG. 10, the pin 810 may have an elongated portion 1000 that extends through the hole 805 in the plug 300A, and a cap portion 1010 that abuts against a top surface of the plug 300A when the pin 810 is fully inserted into the hole 805. The elongated portion 1000 of the pin 810 shown in FIGS. 8 and 9 may have a rectangular cross-section, however other cross-sectional shapes may be used. Similarly, the cap portion 1010 of the pin 810 shown in FIGS. 8 and 9 is round, however the cap portion 1010 may be any other shape. The cap portion 1010 may be coupled to the elongated portion 1000 by a narrowed portion 1020 that has a smaller cross-sectional area than the elongated portion 1000. The plug 300A according to the exemplary embodiment of FIGS. 8 and 9 may include an inner wall 315 and an outer wall 305 coupled by a single solid connecting member 400 that extends around the entire circumference of the plug 300A. In the exemplary embodiment of FIGS. 8 and 9, the connecting member 400 is integrally formed with the inner wall 315 and the outer wall 305, however they may be separate components that are coupled using any coupling mechanism, as one skilled in the art would understand. In addition, the plug 300A may include cavities 405A located around the socket drive 410. Unlike the cavities 405 shown in FIG. 4, the cavities 405A of FIG. 9 are not visible from the top of the plug 300A. The plug 300A may also include one or more tabs 815 (four are shown in FIG. 8, though any number may be used) that extend outwardly from the top surface of the plug 300A, and are configured to allow a user to rotate the plug 300A using the user's fingers or a tool, such as a wrench.

In practice, when the plug 300A is inserted into the valve 200, the keys 310 of the plug 300A are inserted to the respective notches 220 in the valve 200 until the keys 310 reach the respective circumferential groove 225 beneath the corresponding notch 220. The elongated portion 1000 of the pin 810 may be slightly larger than the hole 805 in the plug 300A, so that the pin 810 cannot be pulled back out of the hole 805. Once the plug 300A has been inserted to the point that the keys 310 are respectively horizontally aligned with the circumferential grooves 225, the plug 300A is rotated in a first direction (e.g., clockwise) so that that the keys 310 move within the respective circumferential grooves 225 until the keys 310 reach the respective ends of the circumferential grooves 225, which prevent the plug 300A from rotating further. When the plug 300A has been rotated so that the keys 310 reach the respective ends of the circumferential grooves 225, the hole 805 in the plug 300A is aligned with one of the notches 220 in the valve 200, such that the elongated portion 1000 of the pin 810 can be inserted through the hole 805 in the plug 300A and into the notch 220 in the valve 200. In this position, the pin 810 may be substantially adjacent to a side wall of the notch 220, such that if the plug 300A is rotated in a second direction (e.g., counterclockwise), the elongated portion 1000 of the pin 810 will be pressed against the side wall of the notch 220. The pin 810 may be configured to break at the narrowed portion 1020 when the elongated portion 1000 of the pin 810 is pressed against the side wall of the notch 220 due to the rotation of the plug 300A in the second direction. The cap portion 1010 of the pin 810 may then fall off the top surface of the plug 300A, which would indicate to a user that the plug 300A had been tampered with. Alternatively, even if the cap portion 1010 of the pin 810 did not fall off, the broken pin 810 would also indicate tampering.

Many different embodiments have been disclosed herein, in connection with the above description and the drawings. It will be understood that it would be unduly repetitious to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. A plug for a valve, the plug comprising:
   an outer wall;
   one or more keys disposed on an external surface of the outer wall; and
   a tamper-evident pin;
   wherein said keys are sized and shaped to respectively fit within one or more corresponding notches and one or more circumferential grooves in the valve to secure the plug to the valve;
   wherein the plug is configured to be inserted into the valve so that the one or more keys of the plug are respectively inserted into the one or more notches, and the one or more keys of the plug are configured to be respectively moved within the one or more circumferential grooves in a first direction as the plug is rotated;
   wherein the plug comprises a hole that is configured to be aligned with one of the notches in the valve;
   wherein the tamper-evident pin is configured to be inserted into the hole and said one of the notches in the valve; and
   wherein the tamper-evident pin is configured to break when pressed against a side wall of said one of the notches by rotating the plug in a second direction.

2. The plug of claim 1, wherein the plug further comprises an inner wall disposed within the outer wall, and one or more coupling members configured to couple the inner wall to the outer wall.

3. The plug of claim 2, wherein the plug further comprises a socket drive disposed within the inner wall and configured to receive a device to rotate the plug within the valve in the first direction.

4. The plug of claim 3, wherein the socket drive comprises one or more reliefs configured to prevent the device from rotating the plug within the valve in the second direction.

5. The plug of claim 1, wherein the tamper-evident pin includes a cap portion and an elongated portion;
   wherein the elongated portion is configured to be inserted through the hole in the plug and into said one of the notches in the valve; and
   wherein the cap portion is configured to be disposed above a top surface of the plug when the elongated portion is inserted into said one of the notches in the valve.

6. A valve-plug assembly comprising:
   a valve comprising a valve body configured to be inserted into a well opening of a container, an upper edge having one or more notches, and one or more circumferential grooves at least partially overlapping with said one or more respective notches;
   a plug comprising an outer wall and one or more keys disposed on an external surface of the outer wall; and
   a tamper-evident pin;
   wherein the one or more keys are sized and shaped to respectively fit within the one or more notches and the one or more circumferential grooves to secure the plug to the valve;
   wherein the plug is configured to be inserted into the valve so that the one or more keys of the plug are respectively inserted into the one or more notches, and the one or more keys of the plug are configured to be respectively moved within the one or more circumferential grooves in a first direction as the plug is rotated; and
   wherein the plug comprises a hole that is configured to be aligned with one of the notches in the valve;
   wherein the pin is configured to be inserted into the hole and said one of the notches in the valve; and
   wherein the pin is configured to break when pressed against a side wall of said one of the notches by rotating the plug in a second direction.

7. The valve-plug assembly of claim 6 wherein the valve further comprises a threaded portion configured to engage a threaded portion of the well opening of the container.

8. The valve-plug assembly of claim 6, wherein the plug further comprises an inner wall disposed within the outer wall, and one or more coupling members configured to couple the inner wall to the outer wall.

9. The valve-plug assembly of claim 8, wherein the plug further comprises a socket drive disposed within the inner wall and configured to receive a device to rotate the plug within the valve in the first direction.

10. The valve-plug assembly of claim 9, wherein the socket drive comprises one or more reliefs configured to prevent the device from rotating the plug within the valve in the second direction.

11. The valve-plug assembly of claim 6, wherein the tamper-evident pin includes a cap portion and an elongated portion;
    wherein the elongated portion is configured to be inserted through the hole in the plug and into said one of the notches in the valve; and
    wherein the cap portion is configured to be disposed above a top surface of the plug when the elongated portion is inserted into said one of the notches in the valve.

* * * * *